(12) United States Patent
Kumar et al.

(10) Patent No.: US 9,130,856 B2
(45) Date of Patent: Sep. 8, 2015

(54) CREATING MULTIPLE NOC LAYERS FOR ISOLATION OR AVOIDING NOC TRAFFIC CONGESTION

(71) Applicants: Sailesh Kumar, San Jose, CA (US);
Eric Norige, East Lansing, MI (US);
Joji Philip, San Jose, CA (US);
Mahmud Hassan, San Carlos, CA (US);
Sundari Mitra, Saratoga, CA (US);
Joseph Rowlands, San Jose, CA (US)

(72) Inventors: Sailesh Kumar, San Jose, CA (US);
Eric Norige, East Lansing, MI (US);
Joji Philip, San Jose, CA (US);
Mahmud Hassan, San Carlos, CA (US);
Sundari Mitra, Saratoga, CA (US);
Joseph Rowlands, San Jose, CA (US)

(73) Assignee: NetSpeed Systems, San Jose, CA (US)

( * ) Notice: Subject to any disclaimer, the term of this patent is extended or adjusted under 35 U.S.C. 154(b) by 129 days.

(21) Appl. No.: 13/752,226

(22) Filed: Jan. 28, 2013

(65) Prior Publication Data
US 2014/0211622 A1    Jul. 31, 2014

(51) Int. Cl.
*G01R 31/08* (2006.01)
*H04L 12/803* (2013.01)

(52) U.S. Cl.
CPC .................................... *H04L 47/125* (2013.01)

(58) Field of Classification Search
CPC ....................................................... H04L 47/10
See application file for complete search history.

(56) References Cited

U.S. PATENT DOCUMENTS

| | | | |
|---|---|---|---|
| 5,432,785 A | 7/1995 | Ahmed et al. | |
| 5,764,740 A | 6/1998 | Holender | |
| 5,991,308 A | 11/1999 | Fuhrmann et al. | |
| 6,003,029 A | 12/1999 | Agrawal et al. | |
| 6,249,902 B1 | 6/2001 | Igusa et al. | |
| 6,415,282 B1 | 7/2002 | Mukherjea et al. | |
| 6,925,627 B1 | 8/2005 | Longway et al. | |
| 7,065,730 B2 | 6/2006 | Alpert et al. | |
| 7,318,214 B1 | 1/2008 | Prasad et al. | |
| 7,590,959 B2 | 9/2009 | Tanaka | |
| 7,725,859 B1 | 5/2010 | Lenahan et al. | |
| 7,808,968 B1 | 10/2010 | Kalmanek, Jr. et al. | |

(Continued)

FOREIGN PATENT DOCUMENTS

CN 103684961 A 3/2014
WO 2014059024 A1 4/2014

OTHER PUBLICATIONS

Abts, D., et al., Age-Based Packet Arbitration in Large-Radix k-ary n-cubes, Supercomputing 2007 (SC07), Nov. 10-16, 2007, 11 pgs.

(Continued)

*Primary Examiner* — Samina Choudhry
(74) *Attorney, Agent, or Firm* — Procopio, Cory, Hargreaves & Savitch LLP

(57) ABSTRACT

Systems and methods described herein are directed to solutions for Network on Chip (NoC) interconnects that automatically and dynamically determines the number of layers needed in a NoC interconnect system based on the bandwidth requirements of the system traffic flows. The number of layers is dynamically allocated and minimized by performing load balancing of the traffic flows between the channels and routes of different NoC layers as they are mapped. Additional layers may be allocated to provide the additional virtual channels that may be needed for deadlock avoidance and to maintain the isolation properties between various system flows. Layer allocation for additional bandwidth and additional virtual channels (VCs) may be performed in tandem.

20 Claims, 13 Drawing Sheets

(56) References Cited

U.S. PATENT DOCUMENTS

| | | | |
|---|---|---|---|
| 7,917,885 B2 | 3/2011 | Becker | |
| 8,050,256 B1 | 11/2011 | Bao et al. | |
| 8,059,551 B2 | 11/2011 | Milliken | |
| 8,099,757 B2 | 1/2012 | Riedl et al. | |
| 8,136,071 B2 | 3/2012 | Solomon | |
| 8,281,297 B2 | 10/2012 | Dasu et al. | |
| 8,306,042 B1* | 11/2012 | Abts | 370/401 |
| 8,312,402 B1 | 11/2012 | Okhmatovski et al. | |
| 8,448,102 B2 | 5/2013 | Kornachuk et al. | |
| 8,492,886 B2 | 7/2013 | Or-Bach et al. | |
| 8,541,819 B1 | 9/2013 | Or-Bach et al. | |
| 8,543,964 B2 | 9/2013 | Ge et al. | |
| 8,601,423 B1 | 12/2013 | Philip et al. | |
| 8,635,577 B2 | 1/2014 | Kazda et al. | |
| 8,667,439 B1 | 3/2014 | Kumar et al. | |
| 8,717,875 B2 | 5/2014 | Bejerano et al. | |
| 8,738,860 B1* | 5/2014 | Griffin et al. | 711/122 |
| 2002/0071392 A1 | 6/2002 | Grover et al. | |
| 2002/0073380 A1 | 6/2002 | Cooke et al. | |
| 2002/0095430 A1 | 7/2002 | Egilsson et al. | |
| 2004/0216072 A1 | 10/2004 | Alpert et al. | |
| 2005/0147081 A1 | 7/2005 | Acharya et al. | |
| 2006/0161875 A1 | 7/2006 | Rhee | |
| 2007/0118320 A1 | 5/2007 | Luo et al. | |
| 2007/0244676 A1 | 10/2007 | Shang et al. | |
| 2007/0256044 A1 | 11/2007 | Coryer et al. | |
| 2007/0267680 A1 | 11/2007 | Uchino et al. | |
| 2008/0072182 A1 | 3/2008 | He et al. | |
| 2008/0120129 A1 | 5/2008 | Seubert et al. | |
| 2009/0070726 A1 | 3/2009 | Mehrotra et al. | |
| 2009/0268677 A1 | 10/2009 | Chou et al. | |
| 2009/0313592 A1 | 12/2009 | Murali et al. | |
| 2010/0040162 A1 | 2/2010 | Suehiro | |
| 2010/0211718 A1* | 8/2010 | Gratz et al. | 710/317 |
| 2011/0035523 A1 | 2/2011 | Feero et al. | |
| 2011/0060831 A1 | 3/2011 | Ishii et al. | |
| 2011/0072407 A1 | 3/2011 | Keinert et al. | |
| 2011/0154282 A1 | 6/2011 | Chang et al. | |
| 2011/0276937 A1 | 11/2011 | Waller | |
| 2012/0022841 A1 | 1/2012 | Appleyard | |
| 2012/0023473 A1 | 1/2012 | Brown et al. | |
| 2012/0026917 A1 | 2/2012 | Guo et al. | |
| 2012/0110541 A1 | 5/2012 | Ge et al. | |
| 2012/0155250 A1 | 6/2012 | Carney et al. | |
| 2013/0051397 A1* | 2/2013 | Guo et al. | 370/400 |
| 2013/0054811 A1* | 2/2013 | Harrand | 709/226 |
| 2013/0080073 A1 | 3/2013 | de Corral | |
| 2013/0103369 A1 | 4/2013 | Huynh et al. | |
| 2013/0151215 A1 | 6/2013 | Mustapha | |
| 2013/0159944 A1 | 6/2013 | Uno et al. | |
| 2013/0174113 A1 | 7/2013 | Lecler et al. | |
| 2013/0207801 A1 | 8/2013 | Barnes | |
| 2013/0219148 A1 | 8/2013 | Chen et al. | |
| 2013/0263068 A1 | 10/2013 | Cho et al. | |
| 2013/0326458 A1 | 12/2013 | Kazda et al. | |
| 2014/0068132 A1 | 3/2014 | Philip et al. | |
| 2014/0092740 A1 | 4/2014 | Wang et al. | |
| 2014/0098683 A1 | 4/2014 | Kumar et al. | |
| 2014/0115218 A1 | 4/2014 | Philip et al. | |
| 2014/0115298 A1 | 4/2014 | Philip et al. | |

OTHER PUBLICATIONS

Das, R., et al., Aergia: Exploiting Packet Latency Slack in On-Chip Networks, 37th International Symposium on Computer Architecture (ISCA '10), Jun. 19-23, 2010, 11 pgs.

Ebrahimi, E., et al., Fairness via Source Throttling: A Configurable and High-Performance Fairness Substrate for Multi-Core Memory Systems, ASPLOS '10, Mar. 13-17, 2010, 12 pgs.

Grot, B., Preemptive Virtual Clock: A Flexible, Efficient, and Cost-Effective QOS Scheme for Networks-on-Chip, Micro '09, Dec. 16, 2009, 12 pgs.

Grot, B., Kilo-NoC: A Heterogeneous Network-on-Chip Architecture for Scalability and Service Guarantees, ISCA '11, Jun. 4-8, 2011, 12 pgs.

Grot, B., Topology-Aware Quality-of-Service Support in Highly Integrated Chip Multiprocessors, 6th Annual Workshop on the Interaction between Operating Systems and Computer Architecture, Jun. 2006, 11 pgs.

Jiang, N., et al., Performance Implications of Age-Based Allocations in On-Chip Networks, CVA MEMO 129, May 24, 2011, 21 pgs.

Lee, J. W., et al., Globally-Synchronized Frames for Guaranteed Quality-of-Service in On-Chip Networks, 35th IEEE/ACM International Symposium on Computer Architecture (ISCA), Jun. 2008, 12 pgs.

Lee, M. M., et al., Approximating Age-Based Arbitration in On-Chip Networks, PACT '10, Sep. 11-15, 2010, 2 pgs.

Li, B., et al., CoQoS: Coordinating QoS-Aware Shared Resources in NoC-based SoCs, J. Parallel Distrib. Comput., 71 (5), May 2011, 14 pgs.

International Search Report and Written Opinion for PCT/US2013/064140, Jan. 22, 2014, 9 pgs.

International Search Report and Written Opinion for PCT/US2014/012003, Mar. 26, 2014, 9 pgs.

International Search Report and Written Opinion for PCT/US2014/012012, May 14, 2014, 9 pgs.

Ababei, C., et al., Achieving Network on Chip Fault Tolerance by Adaptive Remapping, Parallel & Distributed Processing, 2009, IEEE International Symposium, 4 pgs.

Beretta, I, et al., A Mapping Flow for Dynamically Reconfigurable Multi-Core System-on-Chip Design, IEEE Transactions on Computer-Aided Design of Integrated Circuits and Systems, Aug. 2011, 30(8), pp. 1211-1224.

Gindin, R., et al., NoC-Based FPGA: Architecture and Routing, Proceedings of the First International Symposium on Networks-on-Chip (NoCs'07), May 2007, pp. 253-262.

Yang, J., et al., Homogeneous NoC-based FPGA: The Foundation for Virtual FPGA, 10th IEEE International Conference on Computer and Information Technology (CIT 2010), Jun. 2010, pp. 62-67.

* cited by examiner

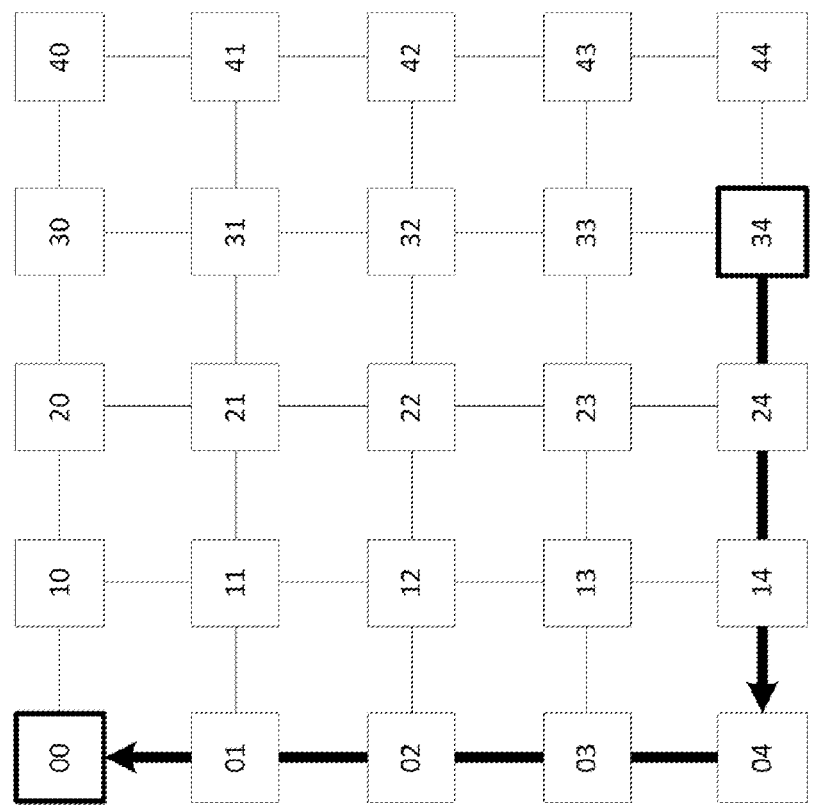

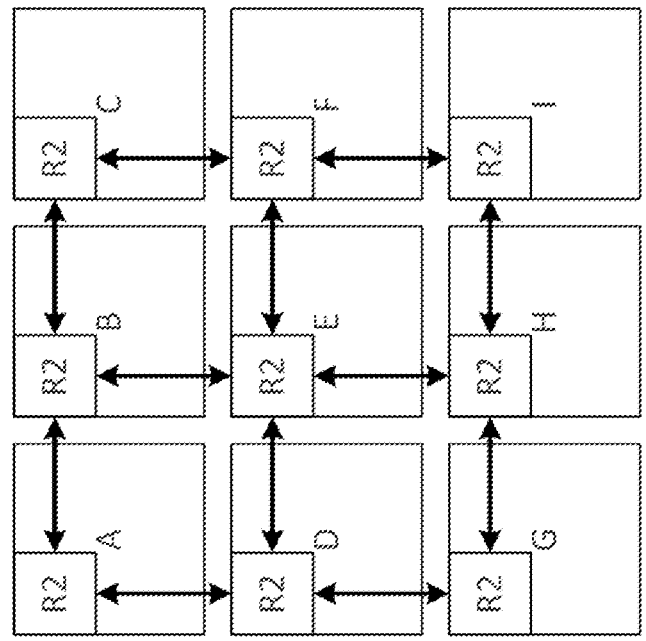
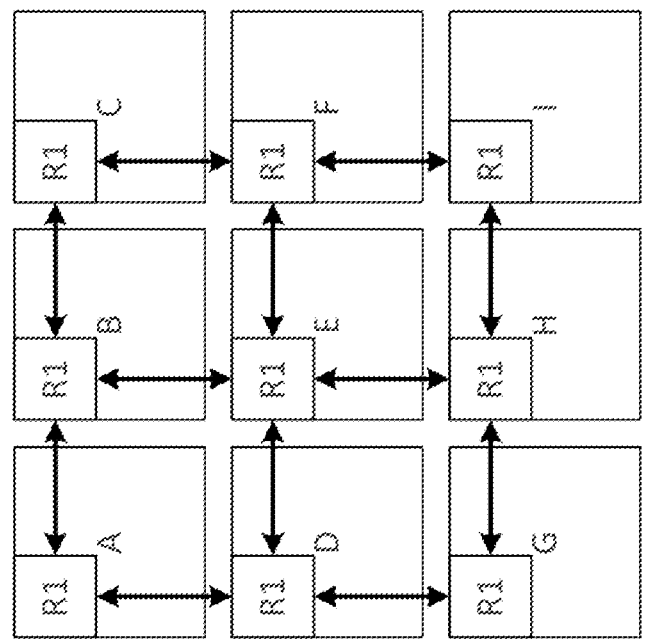
FIG. 3(a)

CREATING MULTIPLE NOC LAYERS FOR ISOLATION OR AVOIDING NOC TRAFFIC CONGESTION

BACKGROUND

1. Technical Field

Methods and example implementations described herein are directed to interconnect architecture, and more specifically, to creating multiple Network on Chip (NoC) layers in a NoC system interconnect architecture.

2. Related Art

The number of components on a chip is rapidly growing due to increasing levels of integration, system complexity and shrinking transistor geometry. Complex System-on-Chips (SoCs) may involve a variety of components e.g., processor cores, DSPs, hardware accelerators, memory and I/O, while Chip Multi-Processors (CMPs) may involve a large number of homogenous processor cores, memory and I/O subsystems. In both SoC and CMP systems, the on-chip interconnect plays a role in providing high-performance communication between the various components. Due to scalability limitations of traditional buses and crossbar based interconnects, Network-on-Chip (NoC) has emerged as a paradigm to interconnect a large number of components on the chip. NoC is a global shared communication infrastructure made up of several routing nodes interconnected with each other using point-to-point physical links.

Messages are injected by the source and are routed from the source node to the destination over multiple intermediate nodes and physical links. The destination node then ejects the message and provides the message to the destination. For the remainder of this application, the terms 'components', 'blocks', 'hosts' or 'cores' will be used interchangeably to refer to the various system components which are interconnected using a NoC. Terms 'routers' and 'nodes' will also be used interchangeably. Without loss of generalization, the system with multiple interconnected components will itself be referred to as a 'multi-core system'.

There are several topologies in which the routers can connect to one another to create the system network. Bi-directional rings (as shown in FIG. 1(a)), 2-D (two dimensional) mesh (as shown in FIG. 1(b)) and 2-D Taurus (as shown in FIG. 1(c)) are examples of topologies in the related art. Mesh and Taurus can also be extended to 2.5-D (two and half dimensional) or 3-D (three dimensional) organizations. FIG. 1(d) shows a 3D mesh NoC, where there are three layers of 3×3 2D mesh NoC shown over each other. The NoC routers have up to two additional ports, one connecting to a router in the higher layer, and another connecting to a router in the lower layer. Router 111 in the middle layer of the example has both ports used, one connecting to the router at the top layer and another connecting to the router at the bottom layer. Routers 110 and 112 are at the bottom and top mesh layers respectively, therefore they have only the upper facing port 113 and the lower facing port 114 respectively connected.

Packets are message transport units for intercommunication between various components. Routing involves identifying a path composed of a set of routers and physical links of the network over which packets are sent from a source to a destination. Components are connected to one or multiple ports of one or multiple routers; with each such port having a unique ID. Packets carry the destination's router and port ID for use by the intermediate routers to route the packet to the destination component.

Examples of routing techniques include deterministic routing, which involves choosing the same path from A to B for every packet. This form of routing is independent from the state of the network and does not load balance across path diversities, which might exist in the underlying network. However, such deterministic routing may implemented in hardware, maintains packet ordering and may be rendered free of network level deadlocks. Shortest path routing may minimize the latency as such routing reduces the number of hops from the source to the destination. For this reason, the shortest path may also be the lowest power path for communication between the two components. Dimension-order routing is a form of deterministic shortest path routing in 2-D, 2.5-D, and 3-D mesh networks. In this routing scheme, messages are routed along each coordinates in a particular sequence until the message reaches the final destination. For example in a 3-D mesh network, one may first route along the X dimension until it reaches a router whose X-coordinate is equal to the X-coordinate of the destination router. Next, the message takes a turn and is routed in along Y dimension and finally takes another turn and moves along the Z dimension until the message reaches the final destination router. Dimension ordered routing may be minimal turn and shortest path routing.

FIG. 2(a) pictorially illustrates an example of XY routing in a two dimensional mesh. More specifically, FIG. 2(a) illustrates XY routing from node '34' to node '00'. In the example of FIG. 2(a), each component is connected to only one port of one router. A packet is first routed over the x-axis till the packet reaches node '04' where the x-coordinate of the node is the same as the x-coordinate of the destination node. The packet is next routed over the y-axis until the packet reaches the destination node.

In heterogeneous mesh topology in which one or more routers or one or more links are absent, dimension order routing may not be feasible between certain source and destination nodes, and alternative paths may have to be taken. The alternative paths may not be shortest or minimum turn.

Source routing and routing using tables are other routing options used in NoC. Adaptive routing can dynamically change the path taken between two points on the network based on the state of the network. This form of routing may be complex to analyze and implement.

A NoC interconnect may contain multiple physical networks. Over each physical network, there may exist multiple virtual networks, wherein different message types are transmitted over different virtual networks. In this case, at each physical link or channel, there are multiple virtual channels; each virtual channel may have dedicated buffers at both end points. In any given clock cycle, only one virtual channel can transmit data on the physical channel.

NoC interconnects may employ wormhole routing, wherein, a large message or packet is broken into small pieces known as flits (also referred to as flow control digits). The first flit is the header flit, which holds information about this packet's route and key message level info along with payload data and sets up the routing behavior for all subsequent flits associated with the message. Optionally, one or more body flits follows the head flit, containing the remaining payload of data. The final flit is the tail flit, which in addition to containing the last payload also performs some bookkeeping to close the connection for the message. In wormhole flow control, virtual channels are often implemented.

The physical channels are time sliced into a number of independent logical channels called virtual channels (VCs). VCs provide multiple independent paths to route packets, however they are time-multiplexed on the physical channels. A virtual channel holds the state needed to coordinate the handling of the flits of a packet over a channel. At a minimum, this state identifies the output channel of the current node for the next hop of the route and the state of the virtual channel (idle, waiting for resources, or active). The virtual channel may also include pointers to the flits of the packet that are buffered on the current node and the number of flit buffers available on the next node.

The term "wormhole" plays on the way messages are transmitted over the channels: the output port at the next router can be so short that received data can be translated in the head flit before the full message arrives. This allows the router to quickly set up the route upon arrival of the head flit and then opt out from the rest of the conversation. Since a message is transmitted flit by flit, the message may occupy several flit buffers along its path at different routers, creating a wormlike image.

Based upon the traffic between various end points, and the routes and physical networks that are used for various messages, different physical channels of the NoC interconnect may experience different levels of load and congestion. The capacity of various physical channels of a NoC interconnect is determined by the width of the channel (number of physical wires) and the clock frequency at which it is operating. Various channels of the NoC may operate at different clock frequencies, and various channels may have different widths based on the bandwidth requirement at the channel. The bandwidth requirement at a channel is determined by the flows that traverse over the channel and their bandwidth values. Flows traversing over various NoC channels are affected by the routes taken by various flows. In a mesh or Taurus NoC, there may exist multiple route paths of equal length or number of hops between any pair of source and destination nodes. For example, in FIG. 2(b), in addition to the standard XY route between nodes 34 and 00, there are additional routes available, such as YX route 203 or a multi-turn route 202 that makes more than one turn from source to destination.

In a NoC with statically allocated routes for various traffic slows, the load at various channels may be controlled by intelligently selecting the routes for various flows. When a large number of traffic flows and substantial path diversity is present, routes can be chosen such that the load on all NoC channels is balanced nearly uniformly, thus avoiding a single point of bottleneck. Once routed, the NoC channel widths can be determined based on the bandwidth demands of flows on the channels. Unfortunately, channel widths cannot be arbitrarily large due to physical hardware design restrictions, such as timing or wiring congestion. There may be a limit on the maximum channel width, thereby putting a limit on the maximum bandwidth of any single NoC channel.

Additionally, wider physical channels may not help in achieving higher bandwidth if messages are short. For example, if a packet is a single flit packet with a 64-bit width, then no matter how wide a channel is, the channel will only be able to carry 64 bits per cycle of data if all packets over the channel are similar. Thus, a channel width is also limited by the message size in the NoC. Due to these limitations on the maximum NoC channel width, a channel may not have enough bandwidth in spite of balancing the routes.

To address the above bandwidth concern, multiple parallel physical NoCs may be used. Each NoC may be called a layer, thus creating a multi-layer NoC architecture. Hosts inject a message on a NoC layer; the message is then routed to the destination on the NoC layer, where it is delivered from the NoC layer to the host. Thus, each layer operates more or less independently from each other, and interactions between layers may only occur during the injection and ejection times. FIG. 3(a) illustrates a two layer NoC. Here the two NoC layers are shown adjacent to each other on the left and right, with the hosts connected to the NoC replicated in both left and right diagrams. A host is connected to two routers in this example—a router in the first layer shown as R1, and a router is the second layer shown as R2. In this example, the multi-layer NoC is different from the 3D NoC, i.e. multiple layers are on a single silicon die and are used to meet the high bandwidth demands of the communication between hosts on the same silicon die. Messages do not go from one layer to another. For purposes of clarity, the present application will utilize such a horizontal left and right illustration for multi-layer NoC to differentiate from the 3D NoCs, which are illustrated by drawing the NoCs vertically over each other.

In FIG. 3(b), a host connected to a router from each layer, R1 and R2 respectively, is illustrated. Each router is connected to other routers in its layer using directional ports 301, and is connected to the host using injection and ejection ports 302. A bridge-logic 303 may sit between the host and the two NoC layers to determine the NoC layer for an outgoing message and sends the message from host to the NoC layer, and also perform the arbitration and multiplexing between incoming messages from the two NoC layers and delivers them to the host.

In a multi-layer NoC, the number of layers needed may depend upon a number of factors such as the aggregate bandwidth requirement of all traffic flows in the system, the routes that are used by various flows, message size distribution, maximum channel width, etc. Once the number of NoC layers in NoC interconnect is determined in a design, different messages and traffic flows may be routed over different NoC layers. Additionally, one may design NoC interconnects such that different layers have different topologies in number of routers, channels and connectivity. The channels in different layers may have different widths based on the flows that traverse over the channel and their bandwidth requirements. With such a large variety of design choices, determining the right design point for a given system remains challenging and remains a time consuming manual process, and often the resulting designs remains sub-optimal and inefficient.

SUMMARY

Aspects of the present application include a method, which may involve automatically and dynamically determining the number of layers needed in a network on chip (NoC) interconnect based on the bandwidth requirements of flows at the channels; performing load balancing between NoC layers by automatically assigning the traffic flows and messages to be routed over certain NoC layers; automatically determining the routes of various traffic flows in the corresponding NoC layers; automatically configuring the channel widths of all NoC layers based on the bandwidth requirements of the traffic flows. Multiple NoC layers may also be allocated for additional virtual channels needed for the system traffic for deadlock avoidance and isolation properties of various traffic flows.

Aspects of the present application include a computer readable storage medium storing instructions for executing a process. The process may involve automatically and dynamically determining the number of layers needed in a network on chip (NoC) interconnect based on the bandwidth requirements of flows at the channels; performing load balancing between NoC layers by automatically assigning the traffic flows and messages to be routed over certain NoC layers; automatically determining the routes of various traffic flows in the corresponding NoC layers; automatically configuring the channel widths of all NoC layers based on the bandwidth requirements of the traffic flows. Multiple NoC layers may also be allocated for additional virtual channels needed for the system traffic for deadlock avoidance and isolation properties of various traffic flows.

Aspects of the present application include a system, which may involve automatically and dynamically determining the number of layers needed in a network on chip (NoC) interconnect based on the bandwidth requirements of flows at the channels; performing load balancing between NoC layers by automatically assigning the traffic flows and messages to be routed over certain NoC layers; automatically determining the routes of various traffic flows in the corresponding NoC layers; automatically configuring the channel widths of all NoC layers based on the bandwidth requirements of the traffic flows. Multiple NoC layers may also be allocated for additional virtual channels needed for the system traffic for deadlock avoidance and isolation properties of various traffic flows.

BRIEF DESCRIPTION OF THE DRAWINGS

FIG. 2(a) illustrates an example of XY routing in a related art two dimensional mesh.

FIG. 3(a) illustrates an example of a related art two layer NoC interconnect.

DETAILED DESCRIPTION

Figure 1A:
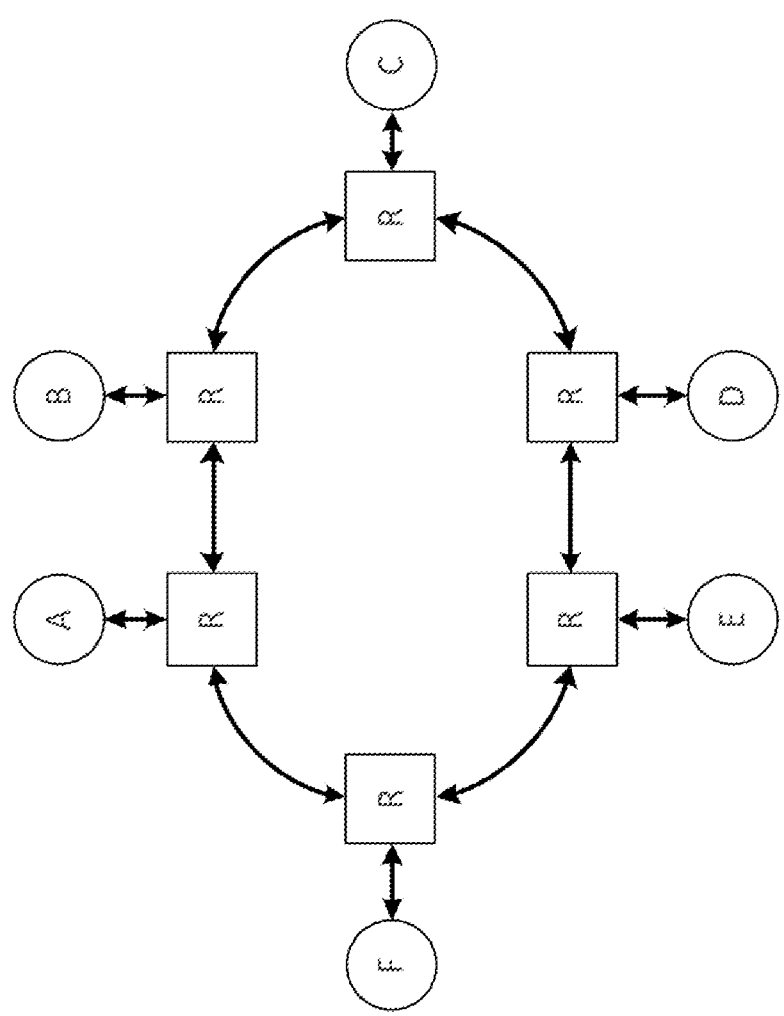
FIGS. 1(a), 1(b) 1(c) and 1(d) illustrate examples of Bidirectional ring, 2D Mesh, 2D Taurus, and 3D Mesh NoC Topologies.
Figure 1B:
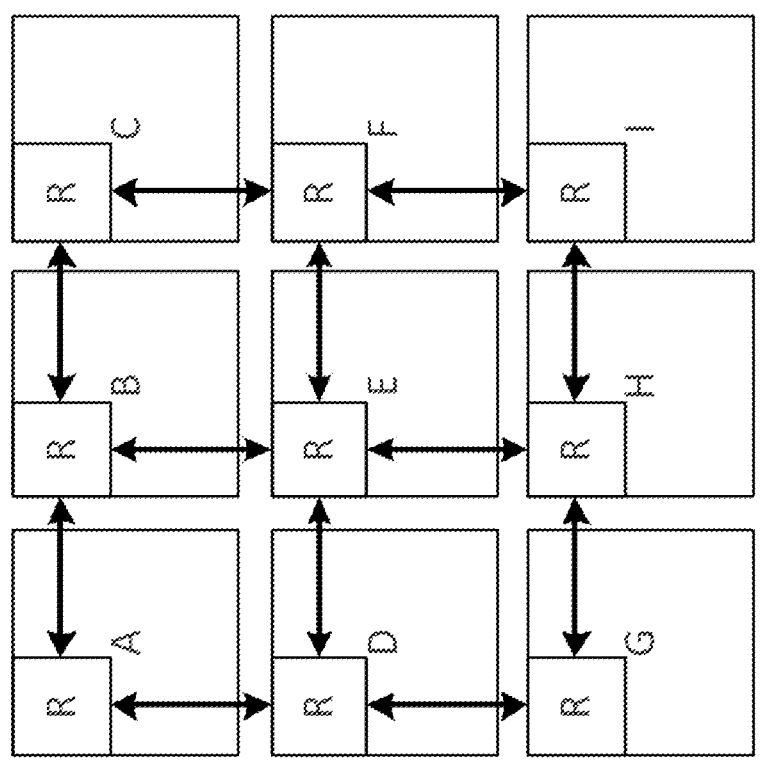
Figure 1C:
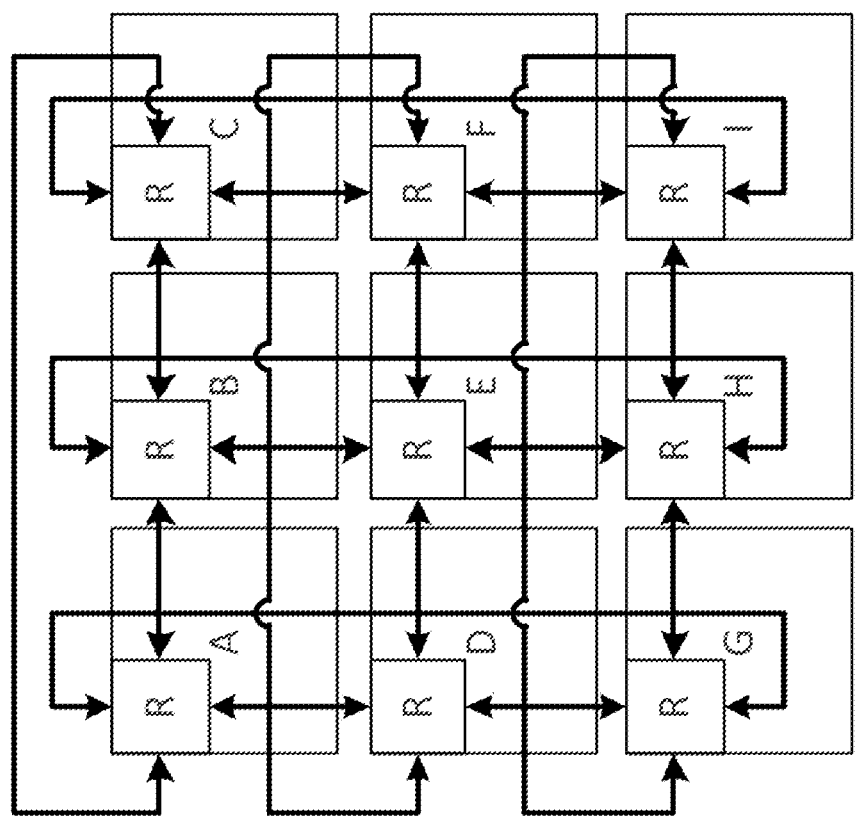
Figure 1D:
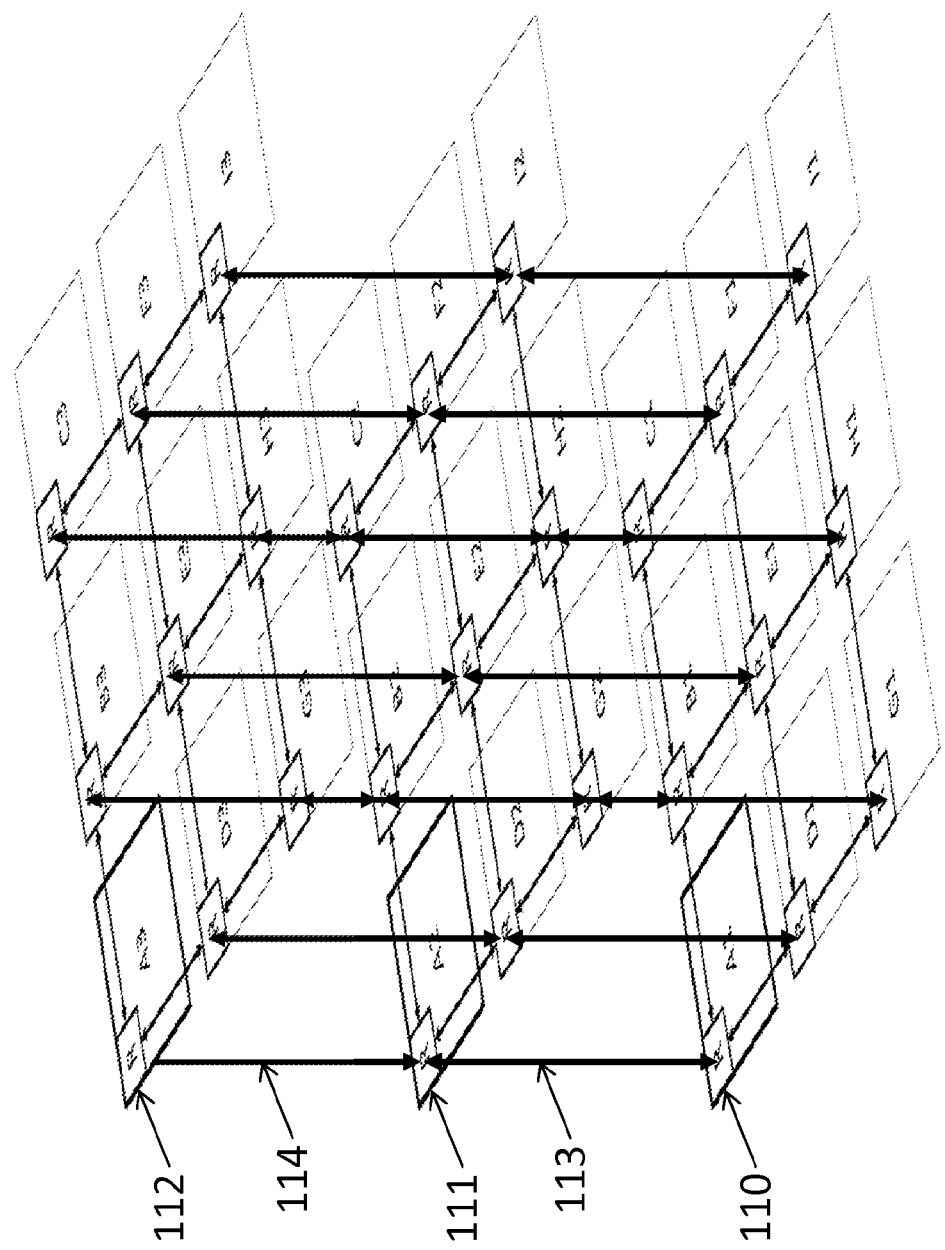
Figure 2B:
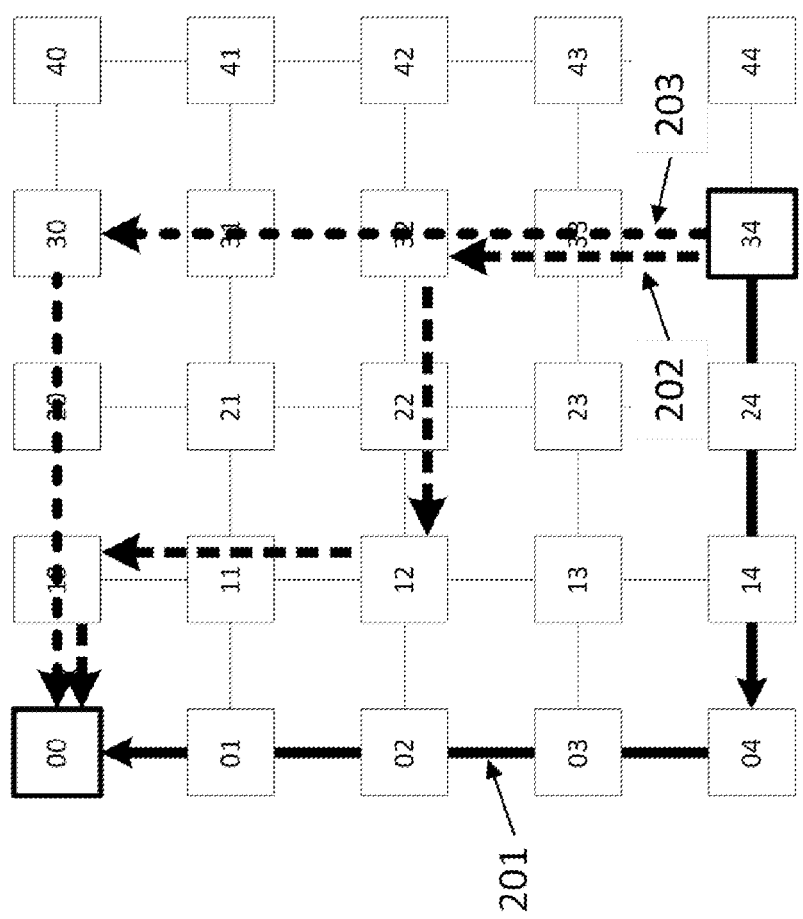
FIG. 2(b) illustrates three different routes between a source and destination nodes.
Figure 3B:
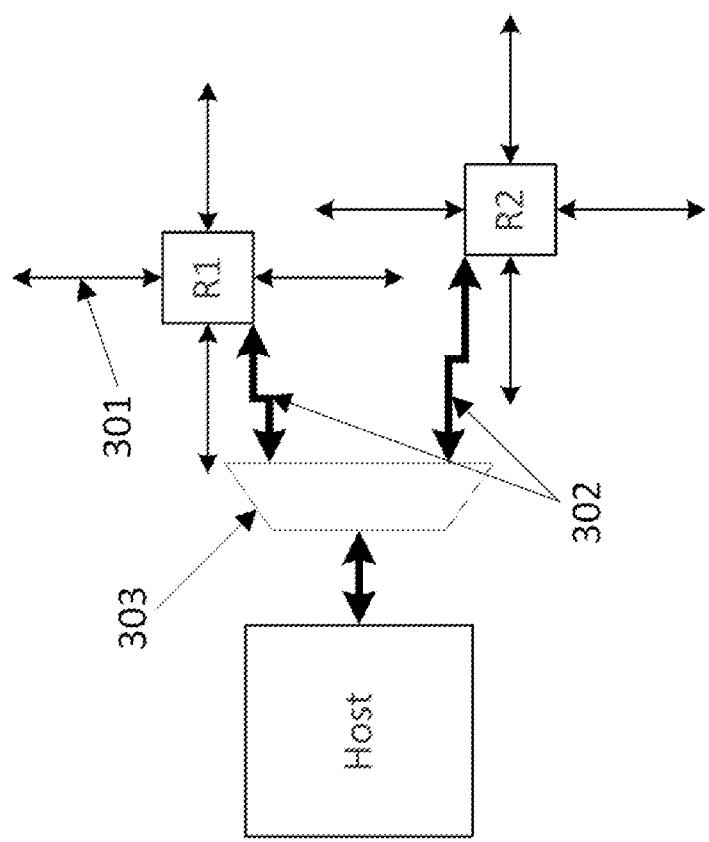
FIG. 3(b) illustrates the related art bridge logic between host and multiple NoC layers.

The following detailed description provides further details of the figures and example implementations of the present application. Reference numerals and descriptions of redundant elements between figures are omitted for clarity. Terms used throughout the description are provided as examples and are not intended to be limiting. For example, the use of the term "automatic" may involve fully automatic or semi-automatic implementations involving user or administrator control over certain aspects of the implementation, depending on the desired implementation of one of ordinary skill in the art practicing implementations of the present application.

In a distributed NoC interconnect connecting various components in a system on chip with each other using multiple routers and point to point links between the routers, congestion may occur if there is excessive traffic on a link. To address congestion, the link may be increased in width, so that more bits of a packet may traverse over the link per cycle. The maximum width however may be limited if packets are short, since making a link wider than the packet size will not result in any bandwidth gains. Additionally, link width may be limited due to certain design restrictions such as wiring congestion and clock frequency. To avoid traffic congestion on the links, system flows may be routed in a load balanced manner using different routes so that all links in the NoC experience a substantially uniform load. NoC links may remain congested, however, if a single NoC layer does not have sufficient bandwidth. To further increase the bandwidth, additional NoC layers may be used and traffic flows may be distributed over the added layers. Each additional NoC layer can provide proportionally higher interconnect bandwidth, thus to satisfy a given bandwidth requirement, some number of NoC layers will be sufficient. Example implementations are directed to automatic computation and allocation of the required number of layers in the NoC interconnect to satisfy the system bandwidth requirements.

Example implementations described herein are directed to solutions for 2-D, 2.5-D and 3-D NoC interconnects for automatically allocating additional NoC layers in a multi-layer NoC to meet the system bandwidth requirements. The example implementations involve: 1) automatically assigning system traffic flows to NoC layers; 2) balancing the load at various channels in each NoC layer by automatically computing the route for various flows assigned to the NoC layers; 3) determining the width of the NoC channels based on the packet sizes, bandwidth requirements and channel width constraints; 4) automatically allocating additional NoC layers if bandwidth requirements of all flows at all channels are not satisfied within the channel width limits; 5) repeating points 1 thru 3, i.e. re-assigning traffic flows to various NoC layers, re-computing the routes for all flows at all NoC layers and the channel widths; and 6) finally repeating the last two steps, 4 and 5, until all system flows are mapped to the NoC layers and bandwidth requirements are fully met.

Another example implementation may combine points 1 and 2 of the above example so that the assignment of system traffic flow to NoC layer and the route computation of the flows are carried out substantially simultaneously for each flow. Flows are processed in a sequence. Available routes in the NoC layers are evaluated for the flow and selected based on a load balancing configuration. The load balancing configuration may be based on a number of policies, such as selecting the route in the NoC layer that has the lowest total channel load (sum of load on all channels along the route), or the lowest peak channel load. The flow is then assigned to the selected NoC layer and the route for the flow is marked in the NoC layer.

Another example implementation may combine all steps of the above examples and in some order, map each traffic flow to some NoC layer and some route and then automatically re-compute the channel widths after each mapping. If the bandwidth requirement of a channel exceeds the channel width limits during a flow's mapping, additional NoC layers are automatically allocated and the flow is assigned to this new layer. Subsequently, the mapping process will resume and map the next traffic flow; this flow will have one more NoC layer available for mapping. Alternatively, all traffic flows may be re-mapped with an additional NoC layer.

Example implementations may further involve using a maximum bandwidth first order of flow mapping. Thus the flows are sorted with respect to their bandwidth requirements with higher bandwidth values ordered at the beginning; flows are then mapped in this sequence. A number of other sequences may be used. One may also use multiple choices of sequences and map flows using those choices. Then the sequence that requires the minimum number of NoC layers to map all flows, and produces the NoC layers with minimum channel width can be chosen as the sequence of choice and used for the final mapping.

Figure 4:
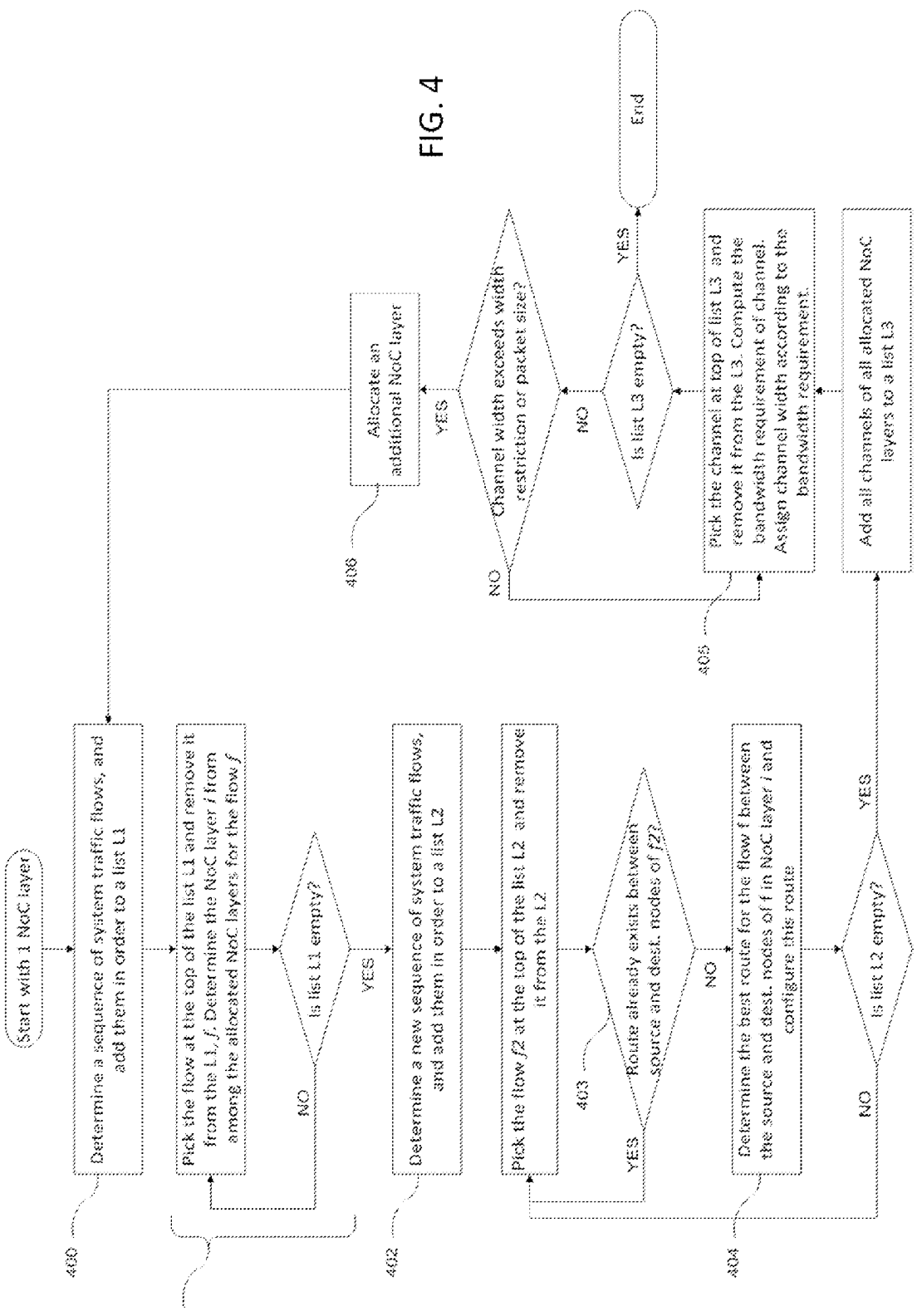
FIG. 4 illustrates a flowchart to perform additional NoC layer allocation automatically during traffic mapping to satisfy the bandwidth requirements, in accordance with an example implementation.

One example implementation for mapping system traffic flows to the NoC interconnect and automatically allocating NoC layers is described in FIG. 4, wherein the bandwidth requirement of various system traffic flows, and the maximum NoC channel width (which determines the channel's bandwidth) limit is known in advance. The present example implementation further assumes that there can be a single route configured between any pair of source and destination nodes in each NoC layer. Alternative designs may use multiple routes. The system starts with a single NoC layer and begins mapping traffic flows onto the NoC channels. The traffic flows are mapped to the NoC one by one, and as shown at 400, a sequence is determined in which the flows are mapped. Once the sequence is determined, and flows are put into an ordered list for processing and mapping. A number of sequences may be used, such as higher bandwidth flow first, lower latency flow first, and flows with common source and common destination may be processed consecutively. At 401, NoC layers are determined for all flows in the sequence. Notice that in this design, the NoC layer determination may be oblivious of the channel loads as route within the NoC layers for various flows are not yet determined. Thus, schemes can be used such as tracking the total load on various NoC layers, and using the least loaded NoC layer for the next flow.

At 402, the system traffic flows are again sequenced for route computation; the same sequence determined at 400 or an alternative sequence may be used. The sequence may be determined using the bandwidth requirements of various flows, or based on the dependencies of various flows. Various sequences may provide different results, and one may try a number of sequences and then the one that gives the best results is used. If a route between the source and destination nodes is already configured in the NoC layer where flow is mapped, then this flow may be skipped as shown at 403. At 404, the route is computed between the source and destination nodes of the flow in the flow's NoC layer. Assuming that the shortest path Manhattan route is used and there are multiple such routes available, a number of schemes can be used for the route selection. One may select a route that has the lowest cumulative load on all channels along the route, or one may pick the route that has the lowest peak load across all channels of the route. Such schemes will attempt to keep the load on all channels uniform.

After routes for all flows are computed and configured in their respective NoC layers, the resulting bandwidth requirement or load on the channels of the NoC is computed as shown at 405, wherein channels may be processed in any order. To compute the load on a channel, a bipartite graph may be constructed with the source nodes of the flows on the channel on the left hand side, and the destination nodes on the right. The flows will add edges between the source and destination graph nodes; the capacity of the edge will be equal to the bandwidth of the flow. In this graph the maximum flow will represent the maximum load on the channel. The scheme is described in greater detail in U.S. application Ser. No. 13/647,557, herein incorporated by reference in its entirety for all purposes. Alternative schemes may be used to compute the channel load. Once the channel load is computed, the width of the channel is determined to satisfy this load or the bandwidth requirement. If the width exceeds the limit on the channel width, then the current number of NoC layers is assumed to be insufficient to meet the system traffic bandwidth requirements. At 406, a new NoC layer is allocated and added to the current set of NoC layers, and the entire procedure may then be repeated starting at 400.

In the above example implementation, the assignment of traffic flows to NoC layers is performed prior to the route selection. Upon route selection, the number of flows on a channel is known, and the NoC assignment may be implemented without knowledge of the number of flows mapped to a particular channel and the resulting channel loads. This may lead to some non-uniformity for the channel load. An example implementation to address this possibility is described in FIG. 5. Reference numerals and descriptions from redundant elements of FIG. 4 are omitted for clarity.

In this example implementation, the flows are processed in some sequence; for each flow currently being processed, both the NoC layer selection and the route selection are carried out substantially simultaneously at 500. All candidate routes in all NoC layers are examined for the flow and selected based on a load balancing configuration; subsequently in step 501, the flow is assigned to all channels of the selected route in the selected NoC layer and the route is configured in the NoC layer between the source and destination nodes (if it is was not configured earlier). To select the route and NoC layer, the load balancing configuration may be based on a number of schemes such as selecting the one with the minimum number of flows assigned to the channels along the route, or the one that has the smallest maximum flows assigned to any channel along the route.

This example implementation may result in more efficient use of NoC layers and uniform number of flows mapped to NoC channels. However the example implementation may not take into account the load on various channels of the NoC layers during flow mapping; the channel loads are analyzed later at 502. If load exceeds the width limit, then a new NoC layer is allocated and the entire procedure can be repeated.

Figure 5:
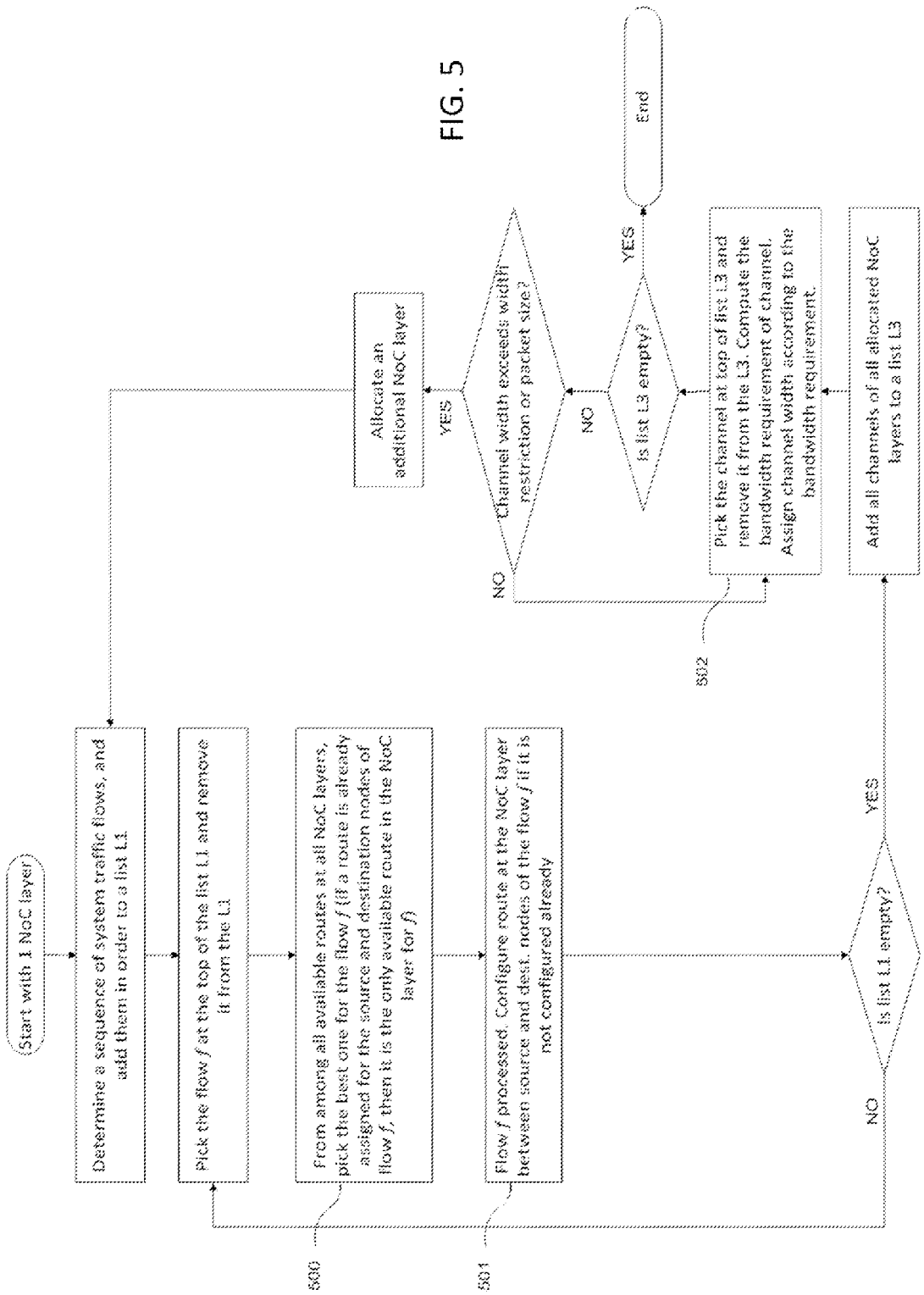
FIG. 5 illustrates an example implementation to perform additional NoC layer allocation automatically during traffic mapping to satisfy the bandwidth requirements.

An additional implementation may maintain and update the load on various channels of the NoC as flows are mapped incrementally, and use the load value as a feedback to map the remaining flows, instead of using the number of flows on a channel as the feedback. This example procedure is described in FIG. 6. Reference numerals and descriptions from the elements of FIG. 5 are omitted for clarity.

Figure 6:
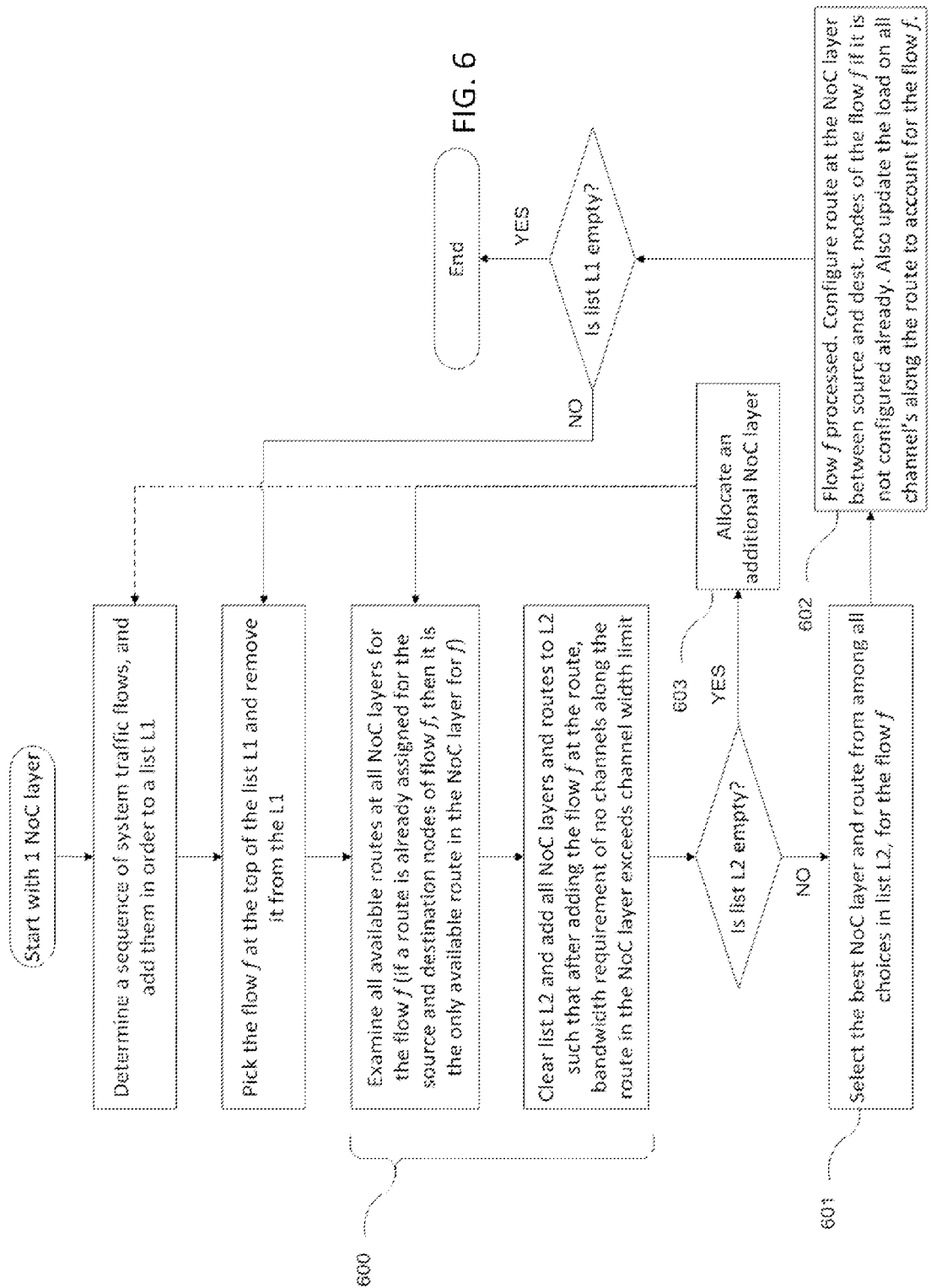
FIG. 6 illustrates an example implementation to perform additional NoC layer allocation automatically during traffic mapping to satisfy the bandwidth requirements.

In the example implementation of FIG. 6, the flows are processed in some sequence, and for every flow currently being processed, all valid routes at all NoC layers are examined to determine if adding the flow to the route in the NoC layer will violate the channel width limit or not. At 600, all valid routes and NoC layers where violation does not occur are added to a list L2. Subsequently, at 601, the best NoC layer and route is chosen from among all choices in list L2. Again this selection may be performed to minimize the average load on all NoC channels or the peak load on the most loaded NoC channel. At 602, the chosen route is configured in the chosen NoC layer if it is not already configured, and the channel loads are updated. If no valid routes exist then a new NoC layer is allocated (603) and the procedure from 600 is repeated, i.e. the flow is attempted to be mapped again. In an alternative design, the entire procedure may be repeated with the additional NoC layer as illustrated by the dotted arrow from the NoC layer allocation at 603.

This example implementation remains aware of the load on various NoC channels as flows are being mapped to one of the available NoC layers/routes and may ensure that no channel's width limitation is violated. This can potentially detect the need of additional NoC layers early on during the mapping, and may also lead to more balanced load on all channels. One further optimization may be utilized in this scheme. Since only valid routes where width violation does not occur are considered for mapping any flow, one may map the flows to the most loaded but valid routes (the one where the channels are most loaded) as part of the procedure at 601 instead of the more intuitive least loaded routes. Thus, the flows will tend to map to the busiest routes first while ensuring that the channel's along the route remains within the width limit, and keep the less loaded routes and channels available for the future flows. This optimization may fully utilize the existing channels of the existing NoC layers before needing to allocate a new NoC layer, thus reducing the number of NoC layers needed to map all traffic flows in the system.

Using multiple NoC layers and dynamically allocating additional ones during traffic mapping is important for bandwidth provisioning in the NoC to satisfy the system traffic bandwidth requirements. Example implementations of the present application are also directed to ensuring that multiple NoC layers may also be automatically provisioned for the additional virtual channels (VCs) that are required to provide the isolation properties specified between various traffic classes and to avoid the network level deadlocks. In a single NoC layer the number of VCs may be limited based on the hardware design of the individual routers. If the number of VCs is not sufficient to map all traffic flows while maintaining the deadlock avoidance and traffic isolation properties then additional NoC layers are needed to obtain more VCs to map the traffic flows. Additional layers will also provide more bandwidth in addition to the increased number of VCs therefore additional layers may be allocated dynamically to provide both the additional bandwidth needed and the additional VCs in tandem. An example implementation is now described where additional layers are allocated for more bandwidth and/or more VCs needed to avoid deadlock and enforce the isolation properties of various traffic flows.

Figure 7:
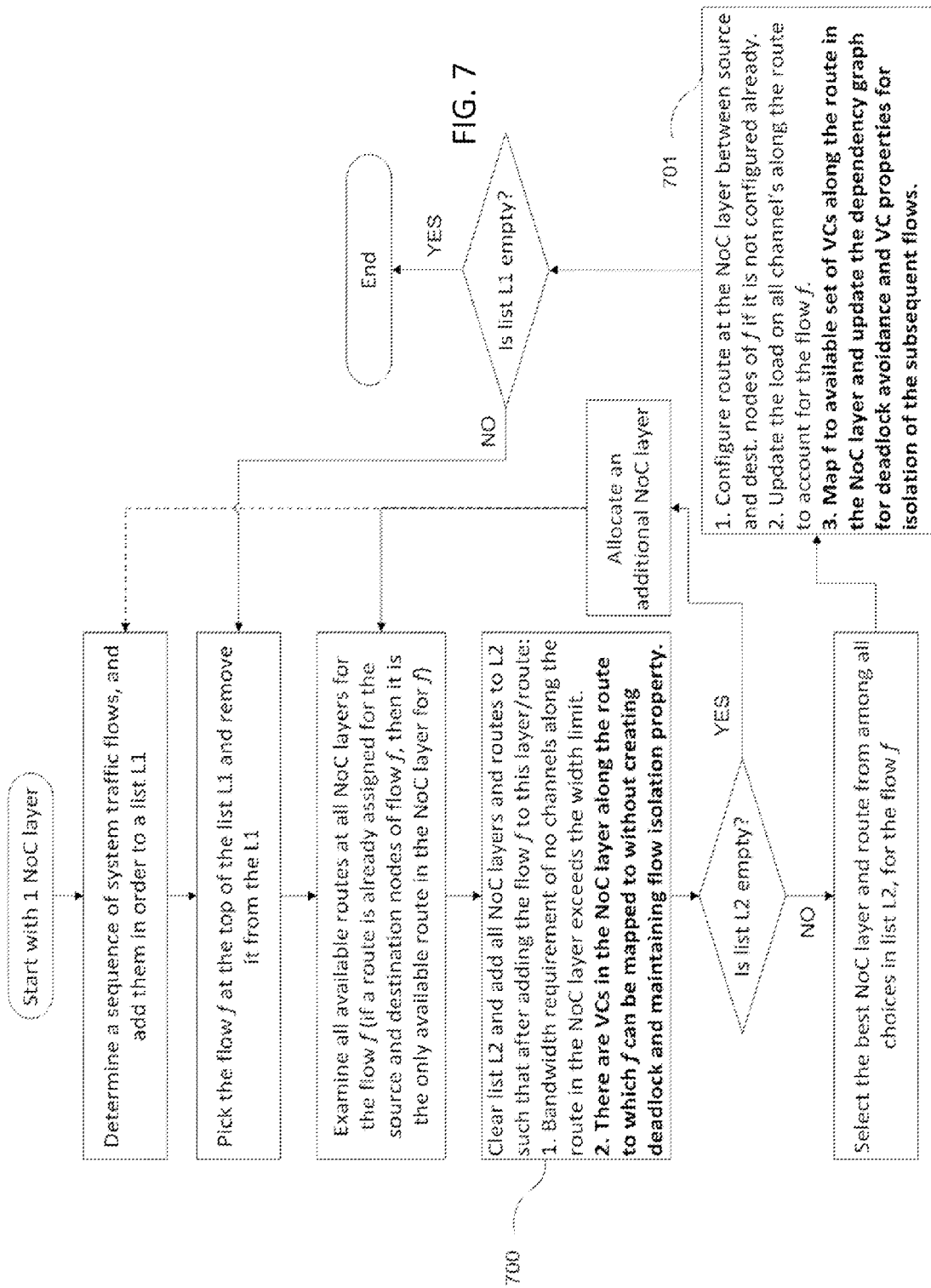
FIG. 7 illustrates a flowchart of an example implementation in which additional NoC layers may be allocated automatically to satisfy bandwidth requirements and/or provide additional VCs for deadlock avoidance and/or traffic isolation between various system flows.

FIG. 7 illustrates the flowchart in which additional layers are allocated for both more VCs needed for traffic isolation and deadlock avoidance as well as more bandwidth. This procedure is different from the one shown in FIG. 6 at 700 and 701. Reference numerals and descriptions from the elements of FIG. 6 are omitted for clarity.

At 700, when the NoC layers and routes available to map a flow are considered, an additional check is performed to determine whether the route in the NoC layer has the needed VCs to map the flow f to which can maintain deadlock avoidance; only such routes are considered for the flow. For this purpose, a dependency graph is constructed and updated every time a flow is mapped to a NoC layer, a route and VCs at 701. The details of the dependency graph construction and deadlock detection and avoidance with additional VCs are described in U.S. application Ser. Nos. 13/599,559 and 13/745,684, herein incorporated by reference in their entirety for all purposes. At 700, a check is performed as to whether there are VCs in the route in the NoC layer that can provide the isolation properties to the flow; only those where such VCs are available are considered for the flow. To facilitate this, the VCs maintain certain properties such as QoS class, priority, etc., which can be updated when a flow is mapped, as shown at 701. These VC properties may be used to match against the needed properties of a flow to determine whether a VC can be used for a flow or not.

Figure 8:
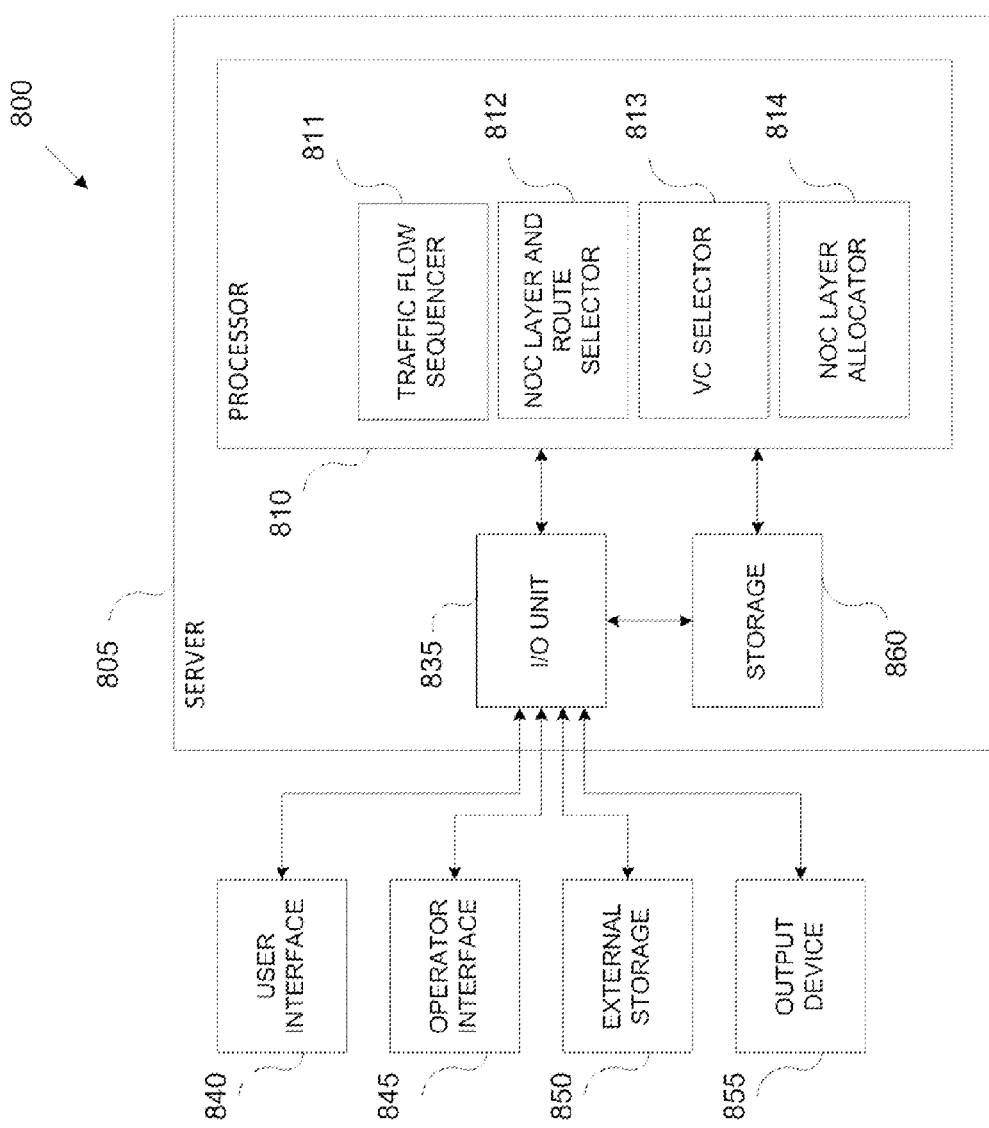
FIG. 8 illustrates a computer/server block diagram upon which the example implementations described herein may be implemented.

FIG. 8 illustrates an example computer system 800 on which example implementations may be implemented. The computer system 800 includes a server 805 which may involve an I/O unit 835, storage 860, and a processor 810 operable to execute one or more units as known to one of skill in the art. The term "computer-readable medium" as used herein refers to any medium that participates in providing instructions to processor 810 for execution, which may come in the form of computer-readable storage mediums, such as, but not limited to optical disks, magnetic disks, read-only memories, random access memories, solid state devices and drives, or any other types of tangible media suitable for storing electronic information, or computer-readable signal mediums, which can include transitory media such as carrier waves. The I/O unit processes input from user interfaces 840 and operator interfaces 845 which may utilize input devices such as a keyboard, mouse, touch device, or verbal command.

The server 805 may also be connected to an external storage 850, which can contain removable storage such as a portable hard drive, optical media (CD or DVD), disk media or any other medium from which a computer can read executable code. The server may also be connected an output device 855, such as a display to output data and other information to a user, as well as request additional information from a user. The connections from the server 805 to the user interface 840, the operator interface 845, the external storage 850, and the output device 855 may via wireless protocols, such as the 802.11 standards, Bluetooth® or cellular protocols, or via physical transmission media, such as cables or fiber optics. The output device 855 may therefore further act as an input device for interacting with a user.

The processor 810 may execute one or more modules. The traffic flow sequencer module 811 may be configured to order the flows based on various properties of the flows and system for processing and to assign the flows to one or more NoC layers, based on a load balancing configuration. The NoC layer and route selector module 812 may track the properties such as load on various channels in the NoC layers to determine which NoC layers and which routes may be used for any given flow and then select the most suitable route. The VC selector module 813 may be configured to select VCs along a route in a NoC layer which avoids deadlock and maintains the traffic isolation properties. The NoC layer allocator module 814 may determine when to allocate an additional NoC layer based on a load balancing configuration from the feedback from the other modules and/or a satisfaction of interconnect bandwidth requirements of the NoC system, and may generate additional virtual channels when allocating an additional NoC layer. Other requirements that the NoC layer allocator module can use to determine the addition of NoC layers can include a satisfaction of deadlock avoidance and/or a provision of system traffic isolation, and bandwidth requirements.

Furthermore, some portions of the detailed description are presented in terms of algorithms and symbolic representations of operations within a computer. These algorithmic descriptions and symbolic representations are the means used by those skilled in the data processing arts to most effectively convey the essence of their innovations to others skilled in the art. An algorithm is a series of defined steps leading to a desired end state or result. In the example implementations, the steps carried out require physical manipulations of tangible quantities for achieving a tangible result.

Moreover, other implementations of the present application will be apparent to those skilled in the art from consideration of the specification and practice of the example implementations disclosed herein. Various aspects and/or components of the described example implementations may be used singly or in any combination. It is intended that the specification and examples be considered as examples, with a true scope and spirit of the application being indicated by the following claims.

What is claimed is:

1. A method, comprising:
utilizing a processor for assigning one or more traffic flows to a plurality of Network on Chip (NoC) layers in an NoC system, based on a load balancing configuration,
wherein each of the plurality of NoC layers is a separate physical or virtual interconnect connecting one or more cores of the NoC system, the each of the plurality of NoC layers is connected by one or more bridges and associated with a sequence of traffic flows, wherein the sequence of traffic flows is processed by a substantially simultaneous selection of a NoC layer of the plurality of NoC layers and a route for each of the one or more traffic flows;
wherein the load balancing configuration comprises one or more policies to balance traffic across one or more channels of one or more NoC layers of the plurality of NoC layers.

2. The method of claim 1, wherein the one or more policies of the load balancing configuration comprises a computation of load balancing routes in the NoC system for the one or more traffic flows assigned to the each of the plurality of NoC layers.

3. The method of claim 1, further comprising determining a width for at least one virtual channel in at least one of the plurality of NoC layers, based on the assigned one or more traffic flows and at least one of a packet size, a bandwidth requirement, and a channel width constraint.

4. The method of claim 1, further comprising:
determining satisfaction of interconnect bandwidth requirements of the NoC system; and allocating additional ones of the NoC layers to the NoC system based on the determined satisfaction of the interconnect bandwidth requirements.

5. The method of claim 1, further comprising providing additional virtual channels to the NoC system by allocating additional NoC layers based on a satisfaction of at least one of deadlock avoidance and a provision of system traffic isolation.

6. The method of claim 1, further comprising providing additional virtual channels and additional bandwidth to the NoC system by allocating additional NoC layers.

7. The method of claim 1, further comprising determining an order for assigning the one or more traffic flows based on at least one of a channel load, a bandwidth utilization and a dependency between flows.

8. A non-transitory computer readable storage medium storing instructions for executing a process, the instructions comprising:
assigning one or more traffic flows to a plurality of Network on Chip (NoC) layers in an NoC system, based on a load balancing configuration,
wherein each of the plurality of NoC layers is a separate physical or virtual interconnect connecting one or more cores of the NoC system, the each of the plurality of NoC layers is connected by one or more bridges and associated with a sequence of traffic flows, wherein the sequence of traffic flows is processed by a substantially simultaneous selection of a NoC layer of the plurality of NoC layers and a route for each of the one or more traffic flows;
wherein the load balancing configuration comprises one or more policies to balance traffic across one or more channels of one or more NoC layers of the plurality of NoC layers.

9. The non-transitory computer readable storage medium of claim 8, wherein the one or more policies of the load balancing configuration comprises a computation of load balancing routes in the NoC system for the one or more traffic flows assigned to the each of the plurality of NoC layers.

10. The non-transitory computer readable storage medium of claim 8, wherein the instructions further comprise determining a width for at least one virtual channel in at least one of the plurality of NoC layers, based on the assigned one or more traffic flows and at least one of a packet size, a bandwidth requirement, and a channel width constraint.

11. The non-transitory computer readable storage medium of claim 8, wherein the instructions further comprise:
determining satisfaction of interconnect bandwidth requirements of the NoC system; and
allocating additional ones of the NoC layers to the NoC system based on the determined satisfaction of the interconnect bandwidth requirements.

12. The non-transitory computer readable storage medium of claim 8, wherein the instructions further comprise providing additional virtual channels to the NoC system by allocating additional NoC layers based on a satisfaction of at least one of deadlock avoidance and a provision of system traffic isolation.

13. The non-transitory computer readable storage medium of claim 8, wherein the instructions further comprise providing additional virtual channels and additional bandwidth to the NoC system by allocating additional NoC layers.

14. The non-transitory computer readable storage medium of claim 8, wherein the instructions further comprise determining an order for assigning the one or more traffic flows based on at least one of a channel load, a bandwidth utilization and a dependency between flows.

15. A system, comprising:
a processor configured to utilize one or more modules, comprising:
a traffic flow sequencer module configured to assign one or more traffic flows to a plurality of Network on Chip (NoC) layers in an NoC system, based on a load balancing configuration,
wherein each NoC layer of the plurality of NoC layers is a separate physical or virtual interconnect connecting one or more cores of the NoC system, the each of the plurality of NoC layers is connected by one or more bridges and associated with a sequence of traffic flows, wherein the sequence of traffic flows is processed by a substantially simultaneous selection of a NoC layer of the plurality of NoC layers and a route for each of the one or more traffic flows;
wherein the load balancing configuration comprises one or more policies to balance traffic across one or more channels of one or more NoC layers of the plurality of NoC layers.

16. The system of claim 15, wherein the one or more policies comprises a computation of load balancing routes in the NoC system for the one or more traffic flows assigned to the each of the plurality of NoC layers.

17. The system of claim 15, further comprising an NoC layer allocator module configured to:
determine satisfaction of interconnect bandwidth requirements of the NoC system; and allocate additional ones of the NoC layers to the NoC system based on the determined satisfaction of the interconnect bandwidth requirements.

18. The system of claim 15, further comprising an NoC layer allocator module configured to provide additional virtual channels to the NoC system by allocating additional NoC layers based on a satisfaction of at least one of deadlock avoidance and a provision of system traffic isolation.

19. The system of claim 15, further comprising an NoC layer allocator module configured to provide additional virtual channels and additional bandwidth to the NoC system by allocating additional NoC layers.

20. The system of claim 15, wherein the traffic flow sequencer module is further configured to determine an order for assigning the one or more traffic flows based on at least one of a channel load, a bandwidth utilization and a dependency between flows.

* * * * *